July 20, 1965
C. A. TEA
3,195,876
SPRING MOUNTING
Filed Jan. 25, 1963
3 Sheets-Sheet 1
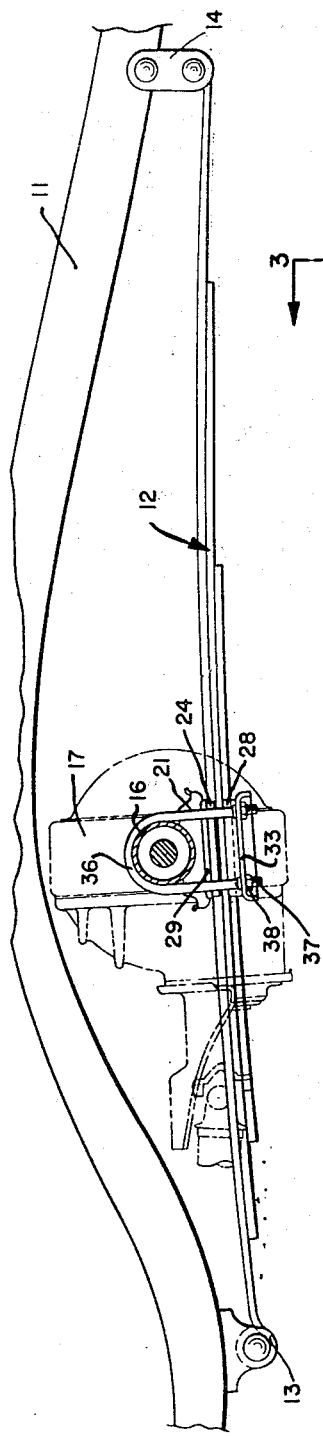
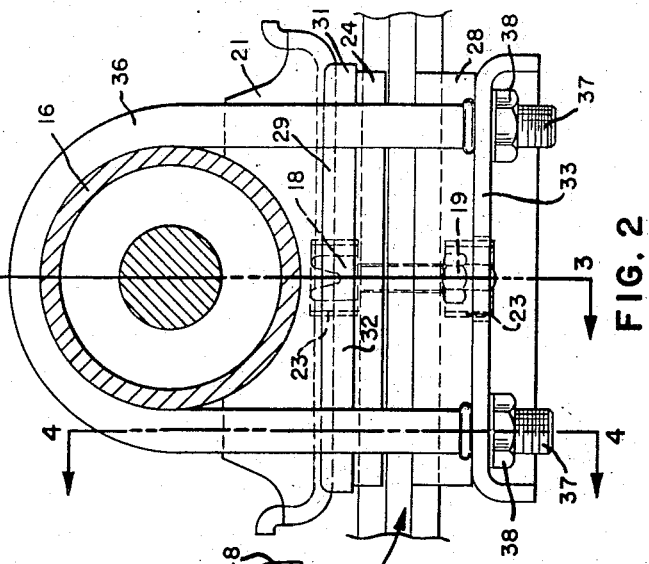
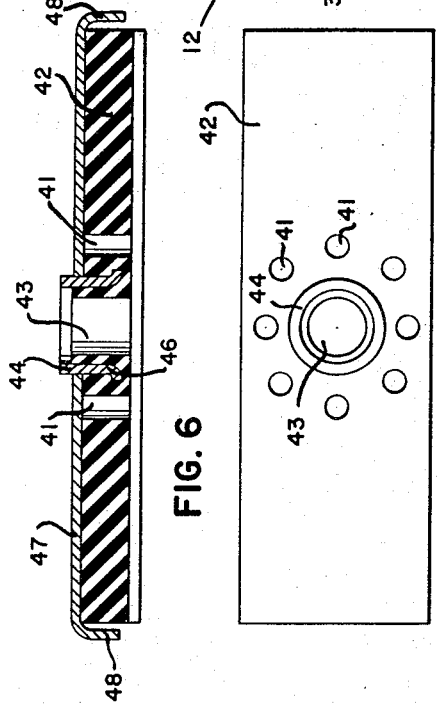
CLARK A. TEA
*INVENTOR.*
BY John C. Faulkner
D. H. Oster
ATTORNEYS July 20, 1965   C. A. TEA   3,195,876
SPRING MOUNTING
Filed Jan. 25, 1963   3 Sheets-Sheet 2

CLARK A. TEA
INVENTOR.

BY John B. Faulkner
Thomas H. Oster

ATTORNEYS

July 20, 1965  C. A. TEA  3,195,876
SPRING MOUNTING
Filed Jan. 25, 1963  3 Sheets-Sheet 3

CLARK A. TEA
INVENTOR
BY John R. Faulkner
Clifford L. Sadler
ATTORNEYS

United States Patent Office 3,195,876
Patented July 20, 1965

3,195,876
SPRING MOUNTING
Clark A. Tea, Southfield, Mich., assignor to Ford Motor Company, Dearborn, Mich., a corporation of Delaware
Filed Jan. 25, 1963, Ser. No. 254,017
8 Claims. (Cl. 267—52)

This invention relates generally to a mounting structure for a leaf spring in a vehicle wheel suspension.

This application is a continuation in part of my copending application Serial Number 848,850 filed October 26, 1959, now abandoned.

Leaf spring suspensions for motor vehicles conventionally clamp the leaf spring to the axle housing, either rigidly or with relatively thin rubber pads positioned on opposite sides of the spring leaf. This arrangement provides little or no insulation between the spring and the axle since the spring is tightly clamped to the axle and the rubber pad, if provided, is highly compressed.

It is an object of the present invention to overcome some of the deficiencies of the conventional construction and to provide effective isolation of power train roughness, harshness and other vibrations to prevent their transmission to the vehicle frame and body. This is particularly advantageous in connection with a unitized type of construction in which the frame and body are integral.

A further object of the present invention is to provide the desirable isolation mentioned above without permitting excessive axle windup under acceleration and braking forces and without causing clutch chatter and power-train shudder.

The present invention achieves these objectives by providing relatively thick rubber pads on opposite sides of the leaf spring assembly and by providing flanged U-bolts for clamping the spring assembly to the axle so that a predetermined uniform compression can be obtained in the rubber pads. Means are also provided for centering and locating the pads with respect to the spring assembly and a flanged retainer is utilized to control roll resistance and to allow the necessary vertical vibration in the rubber pads.

Other objects and advantages of this invention will be made more apparent as this description proceeds, particularly when considered in connection with the accompanying drawings, wherein:

FIGURE 1 is a side elevational view, partly in section, of a portion of a motor vehicle chassis incorporating the spring mounting of the present invention.

FIGURE 2 is an enlarged side elevation of a portion of FIGURE 1.

FIGURE 6 is a longitudinal, cross-sectional view of a modification.

FIGURE 7 is a plan view of the rubber pad shown in FIGURE 6.

Figure 3:
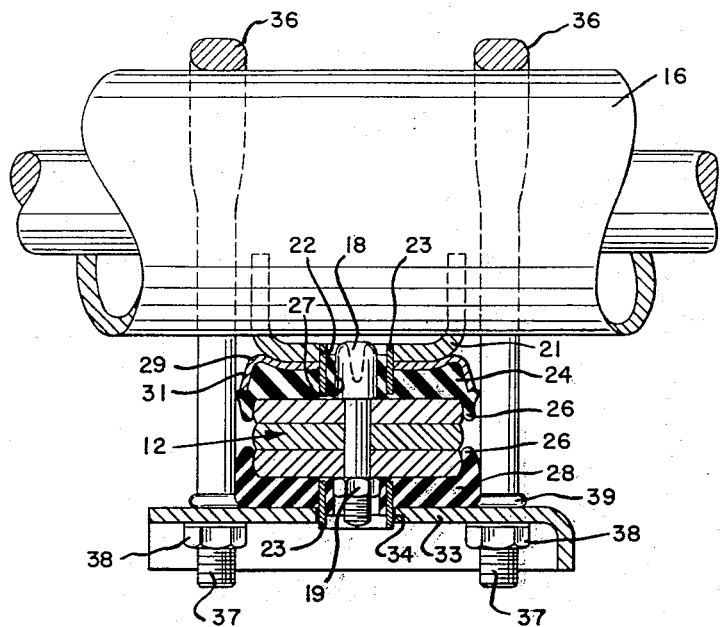
FIGURE 3 is a cross-sectional view taken on the lines 3—3 of FIGURE 2.

Referring to FIGURE 1 of the drawings, the reference character 11 refers to a rearward portion of a motor vehicle frame (or to a unit construction in the case of a unitized vehicle). The conventional laminated leaf spring 12 is connected at its opposite ends to the frame by spring hangers 13 and 14. A similar leaf spring is employed at each side of the vehicle and each of the springs is attached to an axle tube 16 of a rear axle unit 17 by the mounting structure of the present invention.

Referring now to FIGURES 2 to 5 inclusive, the leaves of the leaf spring 12 are conventionally secured together at their center point by means of a headed bolt 18 passing through aligned apertures in the spring leaves and co-operating with a nut 19 to clamp the leaves together. A generally U-shaped spring seat 21 is positioned beneath the axle tube 16 and suitably welded thereto. The spring seat 21 is provided with a central aperture 22 to receive a sleeve 23 molded in the upper rubber insulating pad 24 and forming a pilot therefor.

Figure 5:
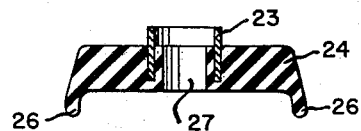
FIGURE 5 is a cross section of one of the rubber pads shown in FIGURE 2, but in its free position.
Figure 4:
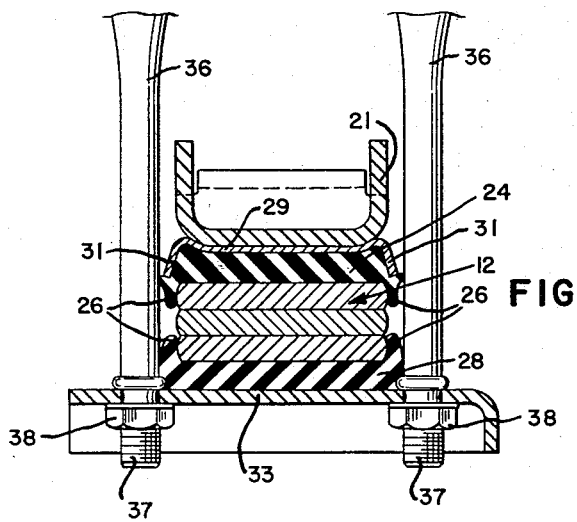
FIGURE 4 is a cross-sectional view taken on the lines 4—4 of FIGURE 2.

Referring now to FIGURE 5, which illustrates a cross section of the rubber pad 24 in its free, uncompressed condition, it will be seen that the pad is relatively thick and has integral side flanges 26 at opposite sides thereof. A central aperture 27 is provided to receive the headed bolt 18 and the metal sleeve 23 is molded in place concentrically with the aperture 27, being suitably bonded to the rubber.

For manufacturing economy the lower spring pad 28 is identical with the upper pad 24 and the two pads are positioned on opposite sides of the leaf spring in reversed relationship. In each instance it will be noted that the side flanges 26 of the pads overlap the side edges of the adjacent spring leaves.

A sheet metal retainer 29 is provided for the upper rubber pad 24 and is formed to the contour of the U-shaped spring seat 21. The retainer 29 is provided with side flanges 31 engaging the opposite sides of the rubber pad 24 and with end flanges 32 overlapping the opposite longitudinal ends of the rubber pad 24 but spaced slightly therefrom to provide a clearance space.

If desired, the lower rubber pad 28 may similarly be provided with a sheet metal retainer although in the embodiment shown in the drawing a retainer is used only in connection with the upper pad. As shown the lower rubber pad 28 is seated upon a spring plate 33 formed with a central aperture 34 receiving the downwardly depending portion of the metal sleeve 23 which is molded in the lower rubber pad 28.

A pair of U-bolts 36 encircle the axle tube 16 and have threaded lower end portions 37 extending through corresponding apertures in the lower spring plate 33 and receiving nuts 38. The U-bolts are provided with upset shoulders 39 and it will be apparent that when the nuts 38 are tightened, the lower spring plate 33 will seat upon the shoulders 39 of the U-bolts so that the plate will be accurately positioned and a predetermined compression applied to the upper and lower rubber pads 24 and 28 respectively. It has been found that a construction providing a compression of the pads of between 20 and 30% will provide a uniform static compression and will achieve an assembly having the desired operating characteristics as well as insulating features. A static load in the neighborhood of 330 p.s.i. has been used and since this is considerably less than the compression resulting from the usual tightening of the U-bolt nuts in a conventional metal-to-metal spring mounting, it has been found that somewhat lighter parts may be used in the assembly, thus effecting a saving in weight and cost. The rubber insulation between the axle housing and the spring is effective to isolate the vehicle body from much of the power train roughness and harshness while at the same time properly controlling the axle windup under acceleration and braking forces so that clutch chatter and power train shudder will not be excessive.

The rate of rubber pads may be varied by varying the hardness or durometer of the rubber used, and added control may also be provided by perforating the center portion of the pad as shown in the modification illustrated in FIGURES 6 and 7. In this modification, an annular series of holes 41 are provided in the rubber pad 42, in an area concentric with the aperture 43 for the spring bolt, and in the center one-third of the rubber pad. These perforations provide space for the rubber of the pad to flow during operating conditions, and thus soften the pad considerably and permit the use of a harder durometer rubber than would be required to obtain the same results in a solid pad. Another variation in the modification is in the provision of guide sleeves 44 having flanges 46 at one end embedded in the rubber pad to provide a mechanical lock therebetween. Bonding is thus not required between the sleeve and the rubber, and in some instances, this is desirable in that it eliminates the possibility of the bonded rubber to sleeve area providing added resistance to compression.

The sheet metal retainer 47 between the pad 42 and the spring seat is formed with downwardly depending end flanges 48 overlapping the ends of the rubber pad. It will be noted that the end flanges 48 are spaced slightly from the adjacent end of the rubber pad 42 and to permit free vertical vibration, to prevent excessive rubber flow and to build up the compressive resistance of the rubber.

Figure 8:
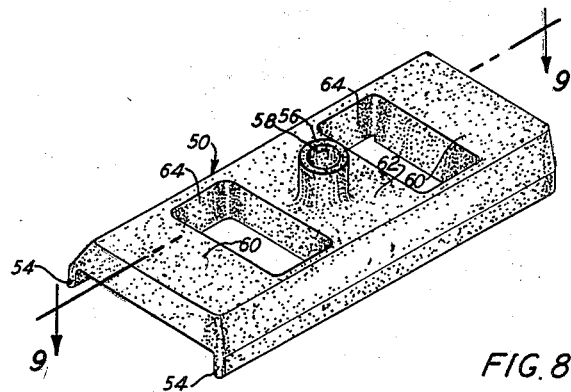
FIGURE 8 is a perspective view of another modification of the rubber pad.
Figure 9:
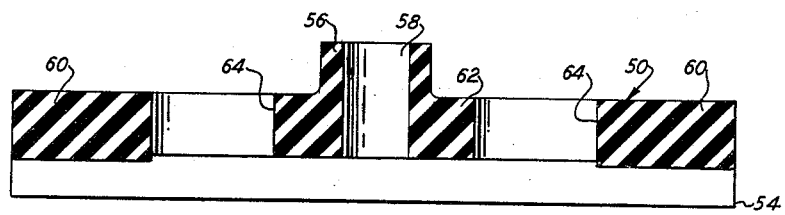
FIGURE 9 is a sectional view along section lines 9—9 of FIGURE 8.

FIGURES 8 and 9 illustrate a further modification of the present invention. These views disclose a rubber pad 50 that may be used in place of the rubber pads 24 and 28 of FIGURES 1 and 2.

The pad 50 is provided with a pair of end portions 60 that are spaced from a central portion 62. The end portions 60 are separated from the central portion by large rectangular apertures 64. As seen in FIGURE 9, an upstanding annular flange or boss 56 extends from the central body portion 62 and has a central bore 58 to receive the head of a spring guide bolt such as bolt 18. Depending flanges 54 extend along the sides of the pad 50.

It will be noted from FIGURE 9, that the end portions 60 are of greater thickness than the central portion 62. When the pad 50 is inserted between upper and lower spring clamps, the end portions 60 will be compressed to provide appropriate vibration isolation and securing of the leaf spring. In this modification, the central region 62 will not be highly compressed and, therefore, will have greater resiliency for absorbing vibrations. The two end masses of rubber 60, being situated some distance from the center region 62, will resist axle windup and other torque reactions. Thus, it is a feature of this design to provide adequate control of axle windup while also providing sufficient resiliency to absorb vibrations and other objectionable disturbances.

Prior to the conception of the present invention, rubber pads such as shown in Patent 1,899,913 to McCuen had been used. In one particular design the rubber pad was ¼ inch thick and, due to the absence of the unique compression limiting U-bolts of this invention, the assembly was tightened until the rubber was only ⅛ of an inch thick. In other words, the rubber was deformed in an amount equal to approximately 50% of its size. It was found that these pads were clamped to carry an initial load of from 18,000 to 24,000 pounds. Under such adverse conditions, the rubber was stressed beyond its elastic limit and it took a permanent set. Instead of having a pad of soft rubber for absorbing vibrations, the end result was a hard piece of material having the consistency of a hard plastic and almost no vibration isolating qualities.

Considerable difficulty was encountered on the assembly line while mass-producing cars having that design. It was found that the only safe approach was to overload the rubber in order to ensure that the entire assembly was secure. Due to wide variations in the conditions of the U-bolts and nuts, it was not possible to control the rubber loadings by using torque limiting wrenches. The friction between one U-bolt and nut might amount to two or three times the friction between another set.

Approximately two million vehicles have been produced incorporating the axle-to-leaf spring connecting device of the present invention. This novel design has had remarkable commercial success. In certain mass-produced versions of the present invention, the rubber pads have a thickness of ½ inch in their pre-assembled condition and are compressed 25% so that the pads are ⅜ inch thick in an assembled state. Unlike previous designs, such as that disclosed in the McCuen patent, these pads do not have "the life squeezed out of them." Where conventional pads had been compressed to carry a load of from 18,000 to 24,000 pounds in the production version of this invention, the pads are compressed so that they carry from 3,000 to 5,000 pounds. With loadings in this range, the rubber retains its resiliency and is able to perform its intended function of isolating vibration.

Several advantages are realized from the lower loading of the rubber. As an example, lighter weight spring clamp plates and other related parts may be used. The present construction is particularly successful in dampening noises and vibrations that exceed a frequency rate of 50 cycles per second.

The term "rubber" as employed in the specification and claims is intended to have reference to any resilient elastomeric material.

It will be understood that the invention is not to be limited to the exact construction shown and described, but that various changes and modifications may be made without departing from the spirit and scope of the invention as defined in the appended claims.

I claim:

1. For use in a motor vehicle, an axle housing, a spring seat positioned beneath said axle housing and formed with a central aperture therethrough, a relatively thick rubber pad positioned beneath said spring seat and having an opening therein in alignment with the aperture in said spring seat but smaller in diameter, a hollow sheet metal member partially embedded in said rubber pad around the opening therein, a portion of said rubber pad being contained within said member, said member having a portion projecting beyond the upper wall of said rubber pad and piloted in the aperture in said spring seat, a multiple-leaf leaf spring positioned beneath said rubber pad, a headed bolt extending through the leaves of said leaf spring with its head extending into the opening in said rubber pad and clamping means clamping said leaf spring to said spring seat, said relatively thick rubber pad being compressively loaded by said clamping means except for the portion of said pad between said headed bolt and said hollow member, said last named portion being substantially stress free.

2. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together, and integral shoulders formed on said U-bolts adjacent the threaded ends thereof forming stops for said spring plate and limiting the compressive loading of said relatively thick rubber pads to a predetermined amount when said nuts are tightened upon the threaded ends of said U-bolts, a headed guide bolt extending through said intermediate portion, one of said pads having an opening and said headed bolt being positioned snug within said opening, a cylindrical sheet metal member partially embedded in said one rubber pad about said opening with an annular portion of said rubber being contained between said cylindrical member and said headed bolt, said spring plate having an opening within which said cylindrical member is positioned.

3. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, side flanges joining said portions, said spaced portions and said flanges defining a pair of intermediate rectangular apertures, said end portions being of greater thickness than said central portion, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together, and integral shoulders formed on said U-bolts adjacent the threaded ends thereof forming stops for said spring plate and limiting the compressive loading of said relatively thick rubber pads to a predetermined amount when said nuts are tightened upon the threaded ends of said U-bolts, said end portions being compressed to approximately 75% of their original unstressed thickness.

4. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, side flanges joining said portions, said spaced portions and said flanges defining a pair of intermediate rectangular apertures, said end portions being of greater thickness than said central portion, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together.

5. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, said end portions being of greater thickness than said central portion, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together, and integral shoulders formed on said U-bolts adjacent the threaded ends thereof forming stops for said spring plate and limiting the compressive loading of said end portions to a predetermined amount when said nuts are tightened upon the threaded ends of said U-bolts.

6. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, said end portions being of greater thickness than said central portion, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together, and integral shoulders formed on said U-bolts adjacent the threaded ends thereof forming stops for said spring plate and limiting the compressive loading of said end portions to a predetermined amount when said nuts are tightened upon the threaded ends of said U-bolts, said end portions being compressed to approximately 70% to 80% of their original unstressed thickness.

7. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, side flanges joining said portions, said spaced portions and said flanges defining a pair of intermediate apertures, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together.

8. For use in a motor vehicle, an axle tube, a leaf spring having an intermediate portion extending beneath said tube, a spring plate positioned beneath the intermediate portion of said leaf spring, a pair of relatively thick rubber pads on opposite sides of said leaf spring, said pads each being of a generally rectangular shape with a central portion and end portions spaced from said central portion, side flanges joining said portions, said spaced portions and said flanges defining a pair of intermediate apertures, one of said pads being positioned between said leaf spring and said axle tube and the other of said pads being positioned between said leaf spring and said spring plate, a pair of U-bolts having their intermediate portions encircling said axle tube and having threaded end portions extending through said spring plate, nuts threadedly engaging the threaded ends of said U-bolts to clamp said spring plate, leaf spring, rubber pads and axle tube together, and integral shoulders formed on said U-bolts adjacent the threaded ends thereof forming stops for said spring plate and limiting the compressive loading of said relatively thick rubber pads to a predetermined amount when said nuts are tightened upon the threaded ends of said U-bolts.

References Cited by the Examiner

UNITED STATES PATENTS

| 1,458,149 | 6/23 | Reed | 267—52 |
| 1,698,006 | 1/29 | Steele | 267—30 |
| 1,869,137 | 7/32 | Flintermann | 267—52 X |
| 1,899,913 | 2/33 | McCuen | 267—52 |
| 2,692,135 | 10/54 | Crane | 267—52 |
| 2,834,624 | 5/58 | Bettison | 248—9 X |

FOREIGN PATENTS

| 364,651 | 6/06 | France. |
| 481,198 | 8/29 | Germany. |

ARTHUR L. LA POINT, *Primary Examiner.*